(12) United States Patent
Heyward

(10) Patent No.: US 9,077,969 B2
(45) Date of Patent: *Jul. 7, 2015

(54) METHOD AND APPARATUS FOR DETERMINING MOTION BETWEEN VIDEO IMAGES

(71) Applicant: Imagination Technologies Limited, Kings Langley (GB)

(72) Inventor: Simon Nicholas Heyward, Harrow (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,849

(22) Filed: Jan. 6, 2014

(65) Prior Publication Data

US 2014/0269921 A1    Sep. 18, 2014

Related U.S. Application Data

(63) Continuation of application No. 13/412,541, filed on Mar. 5, 2012, now Pat. No. 8,625,673, which is a continuation of application No. 11/706,849, filed on Feb. 13, 2007, now Pat. No. 8,130,837.

(51) Int. Cl.
| | |
|---|---|
| *H04N 7/12* | (2006.01) |
| *H04N 19/57* | (2014.01) |
| *H04N 5/14* | (2006.01) |
| *H04N 19/51* | (2014.01) |
| *H04N 19/61* | (2014.01) |
| *H04N 19/426* | (2014.01) |
| *H04N 19/43* | (2014.01) |
| *H04N 19/587* | (2014.01) |
| *H04N 19/513* | (2014.01) |

(52) U.S. Cl.
CPC ......... *H04N 19/00678* (2013.01); *H04N 5/145* (2013.01); *H04N 19/51* (2014.11); *H04N 19/61* (2014.11); *H04N 19/428* (2014.11); *H04N 19/43* (2014.11); *H04N 19/57* (2014.11); *H04N 19/587* (2014.11); *H04N 19/521* (2014.11)

(58) Field of Classification Search
CPC ............. G06T 17/00; G06T 1/60; G06T 1/20; G06T 5/00; H04N 13/0409; H04N 21/434; H04N 9/12; H04N 9/30; H04N 9/641
USPC ........... 375/240.16, 240.21, 240.24; 382/261, 382/275, 300; 345/501, 561, 536, 670; 348/584, 625, 699, 14.02; 353/122

See application file for complete search history.

(56) References Cited

U.S. PATENT DOCUMENTS 4,748,578 A * 5/1988 Lagadec et al. ............... 708/313
7,274,825 B1 * 9/2007 Lee et al. ...................... 382/239

*Primary Examiner* — Thanhnga B Truong
(74) *Attorney, Agent, or Firm* — Michael S. Garrabrants

(57) ABSTRACT

Systems and methods of determining motion vectors, such as for video encoding, are disclosed. In one example, motion vectors are determined for a current frame, using sampled pixel information from a reference frame. Sampled pixel information is obtained using a sampling pattern. The sampling pattern, in one example, includes subsampling pixels at different rates for horizontal and vertical directions. The subsampling rate can differ, based on an amount of motion represented by a matching block (e.g., the farther a match is found away from an origin of the block, the more subsampling can be done). In another example, a full pixel resolution is maintained proximal an original location of the block; as distance increases in one or more directions, subsampling can begin and/or increase. Sampled pixels can be stored. Interpolation of the sampled pixels can be performed and the sampled and resulting interpolated pixels can be used for comparison.

17 Claims, 6 Drawing Sheets

METHOD AND APPARATUS FOR DETERMINING MOTION BETWEEN VIDEO IMAGES

CROSS REFERENCE TO RELATED APPLICATIONS

This application is a continuation of U.S. application Ser. No. 13/412,541, filed on Mar. 5, 2012, now U.S. Pat. No. 8,625,673, which is incorporated by reference in its entirety herein, and which is a continuation of U.S. application Ser. No. 11/706,849, filed on Feb. 13, 2007, which claims priority from GB 0603180.1, filed on Feb. 16, 2006.

BACKGROUND

The present invention relates to a method and apparatus for determining motion between a first and second video image and, in particular, to reducing the number of pixels which are required to be used in order to determine the motion.

Motion video consists of a sequence of image frames. Motion estimation algorithms exploit the fact that these frames do not change significantly in time. Motion vector fields are calculated that describe the displacement of all the pixels in a frame to an earlier frame. The image is usually divided into a grid so that a single motion vector is associated with a group (block) of pixels to reduce computational complexity.

Motion estimation can be performed using a number of different methods, including, for example:

Block-matching techniques as described in section II of De Haan, G.; Biezen, P. W. A. C. "An efficient true-motion estimator using candidate vectors from a parametric motion model" *Circuits and Systems for Video Technology*, IEEE Transactions on Vol. 8, Issue 1, February 1998, pp. 85-91.

Gradient based techniques as described in Horn, B. K. P. & B. G. Schunck, 'Determining Optical Flow,' *Artificial Intelligence*, Vol. 16, No. 1-3, August 1981, pp. 185-203.

FIG. 1 illustrates the known block matching technique between a sequence of two images and demonstrates that block-matching motion estimators typically attempt to find a block of pixels (30) in an earlier frame that has a high correlation to an equally sized block of pixels (20) in the current frame. The correlation is usually measured by a form of error function such as the sum of absolute differences (SAD) or the mean squared error (MSE). The displacement between the best matching blocks represents the motion vector (40). 'Full search' motion estimators choose to search for a matching block across the full range of the previous image. However, to reduce computation, most motion estimators reduce the search window for matching. blocks by defining a maximum search area (10) and either perform a full-search within the window or evaluate only a number of 'candidate' blocks. This search area effectively limits the maximum motion vector size that is supported, and hence the fastest motion that can successfully be estimated as shown in FIG. 2.

Motion estimation is useful for several applications including, for example, motion compensated interpolation, where a number of interpolated frames are reconstructed and displayed between original Images in a sequence. This reduces the motion judder of moving objects in the image sequence. The motion vectors here can be defined at any point in time between the two images, for example the midpoint, and are also used to reconstruct the interpolated frame using motion compensation.•

A further application is video compression, for example, where spatial and/or temporal redundancy is removed. Motion vectors are again used to describe the displacement of Image pixels between successive frames and, in this application, are transmitted in place of image data, thereby reducing the amount of data needed to represent the image sequence.

Other applications that use motion estimation to enhance video sequences include de-interlacing and noise reduction.

Detection and measurement of motion blur is also relevant to the derivation of motion vectors. Motion blur is an effect that occurs in natural image sequences as cameras attempt to capture moving objects. If an object moves while the camera shutter is open, the film acts as an integrating medium and the motion that has occurred is visible as a blur along the trajectory of motion. This known effect' is shown in FIG. 3 and is effectively a low pass filtering operation on the moving image pixels.

The faster object is moving relative to the camera, the greater the motion blur. Since motion blur occurs only along the trajectory, detail present on the moving objects is low-pass filtered in this direction only. This can be seen further in FIG. 3 where detail of the front and rear edges of moving vehicles are not visible, whereas the roof and base edges can still be distinguished. The level of sharpness of edges in an area of the image can be used as an indication of the level of motion. If sharp edges are detected in a particular direction, it can be deduced that in a perpendicular direction, fast motion is unlikely.

In order to successfully estimate motion in a wide variety of image sequences, large vector ranges are required. This increases the search area, hence the number of pixels that are required to be available during the calculation and evaluation of motion vectors within this region.

In order to perform motion estimation with large search areas, the transfer of large amounts of pixel information between processing blocks is necessary which demands large bandwidth.

Pixel storage, when incorporated into a hardware implementation, is expensive and bulky therefore it is desirable to reduce the number of available pixels required in the motion estimation and compensation stages.

Some schemes have previously been proposed to reduce the cost of implementing a large search area and these techniques will be known to those skilled in the art. For example U.S. Pat. No. 6,687,303 describes a scheme where neighbouring pixels in blocks to be evaluated are sub-sampled by 4:1 or 2:1. A similar scheme is described in U.S. Pat. No. 6,317,136 and also U.S. Pat. No. 5,982,910 in which 2:1 sub-sampling is performed on incoming pixel data. Simple sub-sampling such as this is successful in reducing complexity, however useful image information is discarded in the process. This can lead to a reduction in the quality of motion' estimation as details in the image sequence, that aid the estimation and convergence of vectors, may be lost.

We have appreciated that as the speed of motion of an object in an image increases, the degree of low-pass filtering on the object in the image increases due to the motion blur and less detail is visible along the motion trajectory. Therefore, the faster the motion, the less high frequencies are present in the image at this location. It is known from the sampling theorem that the higher the frequency content in a signal, the higher the sampling rate must be in order to fully reconstruct the signal. It therefore follows that as the speed of motion increases, the lower the required sampling rate becomes.

As an extension of this, objects that are moving in a horizontal direction become blurred along the horizontal only and, similarly, vertically moving objects lose detail in this direction but retain horizontal detail. Therefore, for pixels undergoing motion in a certain direction, there will be relatively low frequency content along this trajectory, while frequency content perpendicular to this direction is maintained. This implies that the sampling frequency required along the trajectory of motion is lower than that required in the perpendicular direction. Therefore, in order to minimise the loss of important image details, pixels undergoing horizontal motion can be sub-sampled horizontally and pixels undergoing vertical motion can be sub-sampled vertically.

We have appreciated that in order to retain maximum detail in the search area, all pixels should be maintained. However, pixel storage is expensive and the transfer of large amounts of pixel information requires large bandwidth. Images which include objects in motion include blurring and we have appreciated that in such cases the sampling frequency along the direction of motion can be decreased without experiencing a significant loss of image detail.

Preferred embodiments of the invention perform a subsampling of the pixels within a search area in a predefined pattern. The pattern of sub sampled pixels vanes throughout the search area in order to reduce the number of pixels that are stored, and, thus, to reduce the processing and memory requirements of the system, while maintaining important image details.

Preferred embodiments of the invention increase the degree of sub-sampling of image pixels as the distance from the centre of the search area increases since pixels of the block which appear furthest from the centre are due to the fastest motion and can be sub sampled without a loss in image detail.

Preferred embodiments of the invention maintain high pixel resolution close to the centre of the search area in order to maintain detail of static or slow moving blocks. The size of this high resolution area may be influenced by the maximum available search-area memory.

The invention in its various aspects will now be defined in the claims, to which reference should now be made.

Preferred embodiments of the invention are: now described with reference to the accompanying figures in which.

Figure 4:
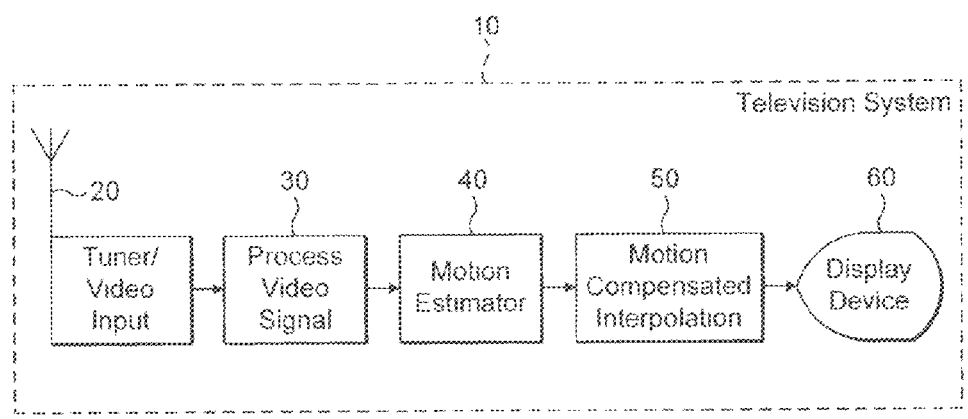
FIG. 4 shows an embodiment of the invention incorporated into a television system.

A preferred embodiment of the invention Is now described when incorporated into a television system with reference to FIG. 4. This embodiment is used to increase the frame rate of High Definition (HD) motion video sequences using motion compensated interpolation. High Definition sequences have increased vertical and horizontal resolution which requires larger vector Omits for describing the motion between frames than for Standard Definition (SD) material.

FIG. 4 shows a television system (10). An antenna (20) (or other video input such as a DVD player) supplies a tuner which in turn provides a video signal to the processor (30). A processed video signal is then supplied to a motion estimator unit (40). The motion estimator estimates the direction and degree of motion between frames and preferably provides this data in terms of vectors. The temporal frame rate of the video signal is then increased by feeding a motion compensated interpolator (50) with vectors supplied from the motion estimator in order to construct intermediate frames. The enhanced video signal is then displayed on a display device. (60).

The motion estimation unit (40) which incorporates the invention is described in detail below with reference to FIG. 5. The function of the motion estimation unit (40) is to determine the motion between consecutive frames. This motion is described in terms of a vector. The motion between frames is determined by breaking down each video frame into a series of blocks containing a predefined number of pixels. That block is then compared with blocks of pixels in an adjacent frame in order to determine the motion of the block between the frames using block matching techniques, for example SAD or MSC.

Figure 1:
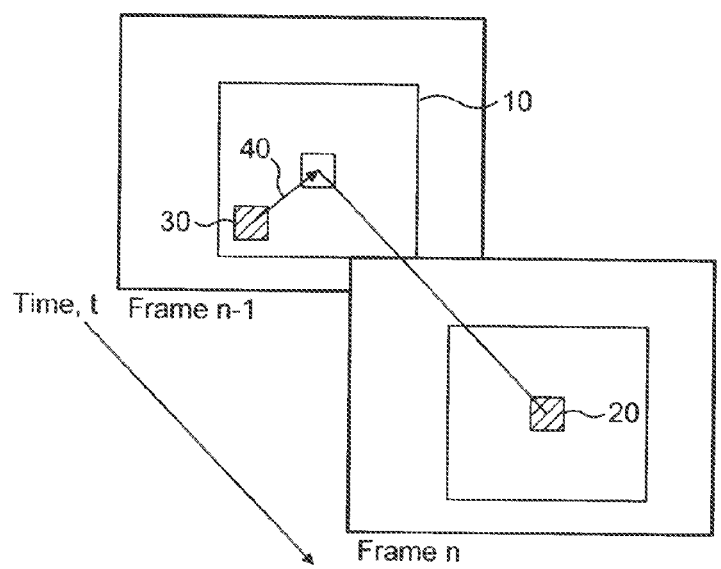
FIG. 1 shows a known block matching motion estimator as used in the prior art.
Figure 2:
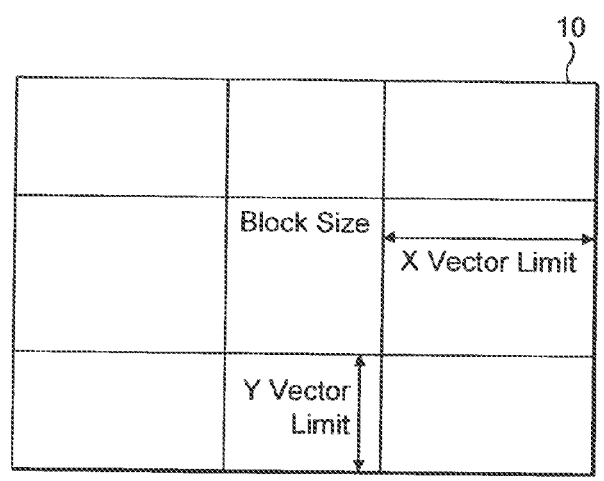
FIG. 2 shows a search area used to estimate motion.
Figure 3:
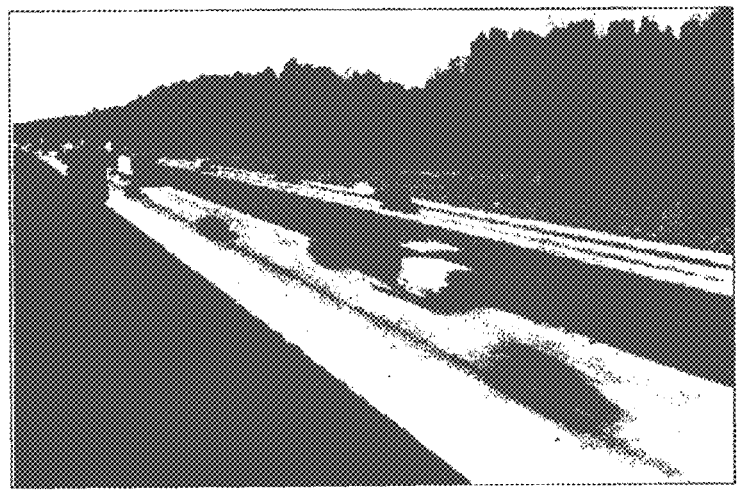
FIG. 3 is an image showing blurred movement of an object.

In order to reduce the area of the frame in which block matching Is executed, embodiments of the invention conduct the block comparison within a specific search area of the adjacent frame. Preferably, the search area is centred on the position of the block in the original frame. The size of the search area is selected in dependence on the memory and processing capabilities of the system. As discussed above with reference to FIG. 2, larger search areas allow greater degrees of motion to be detected and so can be used to estimate faster motion. Motion of the block is then determined using block matching techniques within the search area. Preferred embodiments of the invention process each block of the frame.

In order to provide maximum quality of motion estimation, all pixels within a search area would be used and compared with the block in motion. However, pixel storage, when incorporated into hardware implementation, is expensive and, therefore, it is desirable to reduce the number of pixels used in the search area. In order to reduce the number of pixels, embodiments of the invention sub-sample the pixels of the search area.

A number of factors may be taken into account when deciding how to subsample the pixels of the search area, namely the direction in which motion estimation is required to be most accurate;

whether it is acceptable to lose information in order to reduce the number of pixels;

the magnitude of motion of the block; and the location of blocks of pixels within the search area which will be used as comparison blocks.

Figure 6:
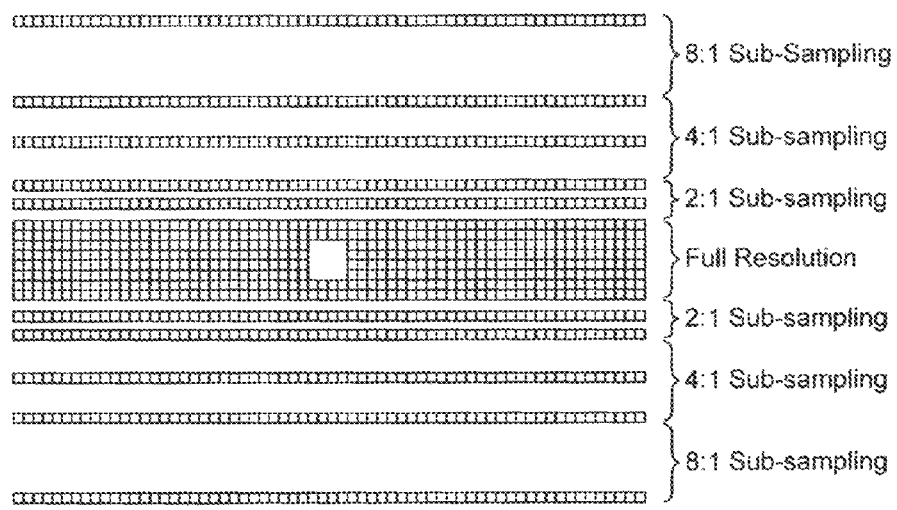
FIG. 6 shows the search area in which the pixels have been subsampled vertically.

In order to estimate motion most accurately in a particular direction, full resolution of pixels should be maintained in that direction to provide more pixels to be available for block matching calculations. Therefore, if accurate motion estimation in the horizontal direction is required, full resolution can be maintained in the horizontal direction. The number of pixels required to be stored can then be reduced by subsampling in the vertical direction. An example of subsampling pixels in the vertical direction, while maintaining a full resolution in the horizontal direction, is shown in FIG. 6. Such a subsampling pattern could be used for video sequences of natural images in which horizontal movement of objects and motion due to camera pans are more common than vertical motion. Such a pattern enables a high accuracy of motion to be determined in the horizontal direction while reducing pixel storage by subsampling in the vertical direction.

Alternatively, the choice of direction of subsampling may be made on the basis of the direction in which subsampling will have minimum effect on data loss. When blocks of pixels are moving in a particular direction detail can be lost in the direction of motion due to motion blur. Since little information can be gained from the blurred pixels, by subsampling in the direction of motion the number of stored pixels can be reduced without losing significant information. Therefore, if an object Ie moving in the horizontal direction, subsampling in the horizontal direction can be used without losing significant information. Conversely, if an object is moving in the vertical direction, vertical subsampling can be used without losing significant information. Therefore, the vertical subsampling pixel pattern of FIG. 6 can be used for vertical motion in order to reduce the number of pixels stored without losing significant detail.

A further consideration in determining the subsampling pattern is the :expected degree of motion of the block. When a block has moved between image frames, search areas which are centered on the original position of the block include the relevant pixels away from the centre of the search area. Specifically, for horizontal motion the relevant pixels are to the left and right of the centre and for vertical motion the relevant pixels are positioned above and below the centre of the search area. As the speed of motion of the object is increased, the degree of subsampling can be increased without compromising on losing image-detail. Conversely, if there is little or no motion the relevant pixels required for motion estimation will be positioned predominantly towards the centre of the search area. Since there will be no motion blur for static or slow moving blocks it is desirable not to subsample the pixel data close to the centre of the search area to avoid losing important image detail.

The final selected subsampling pattern may be chosen to allow measurement of static, medium and fast motion. The degree of sub-sampling may be chosen to remain constant outside a central full-resolution area or, preferably, can be increased as the distance increases from the centre of the search area. For example, zones of 2:1 sub-sampling can be used for moderate motion, 4:1 for fast motion and 8:1 for very fast motion. Such a pattern maintains detail when the block is stationary by maintaining a full resolution at the centre of the search area and, as speed of motion increases and the relevant blocks are further from the centre, the loss of information Is limited due to increasing degrees of motion blur.

A further reduction in the pixel storage requirements can be obtained by using a combination of horizontal and vertical subsampling in combination with regions of full resolution. Again, combination of subsampling ratios can be used in different regions of the search area in order to store the minimum number of pixels while experiencing minimum loss of useful information.

Figure 7:
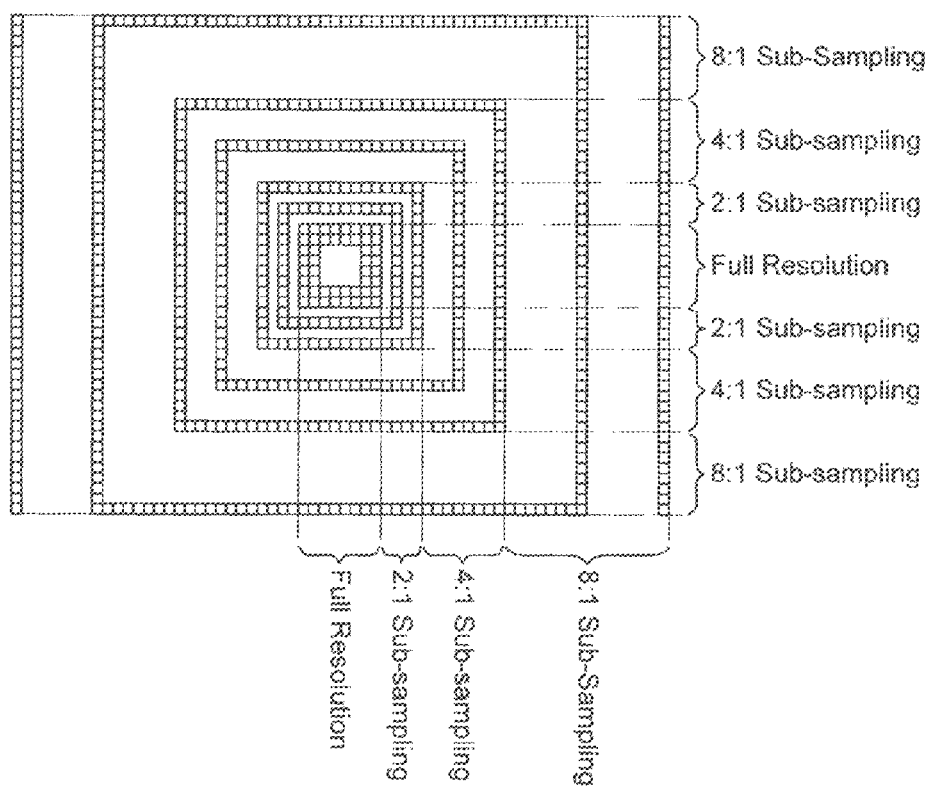
FIG. 7 shows a search area including subsampling in vertical and horizontal directions.

FIG. 7 is an example of a subsampling pattern which incorporates both vertical and horizontal subsampling of different degrees at different regions of the search area. The embodiment of FIG. 7 requires less pixels to be stored than FIG. 6 for an equivalent size search area.

Figure 8:
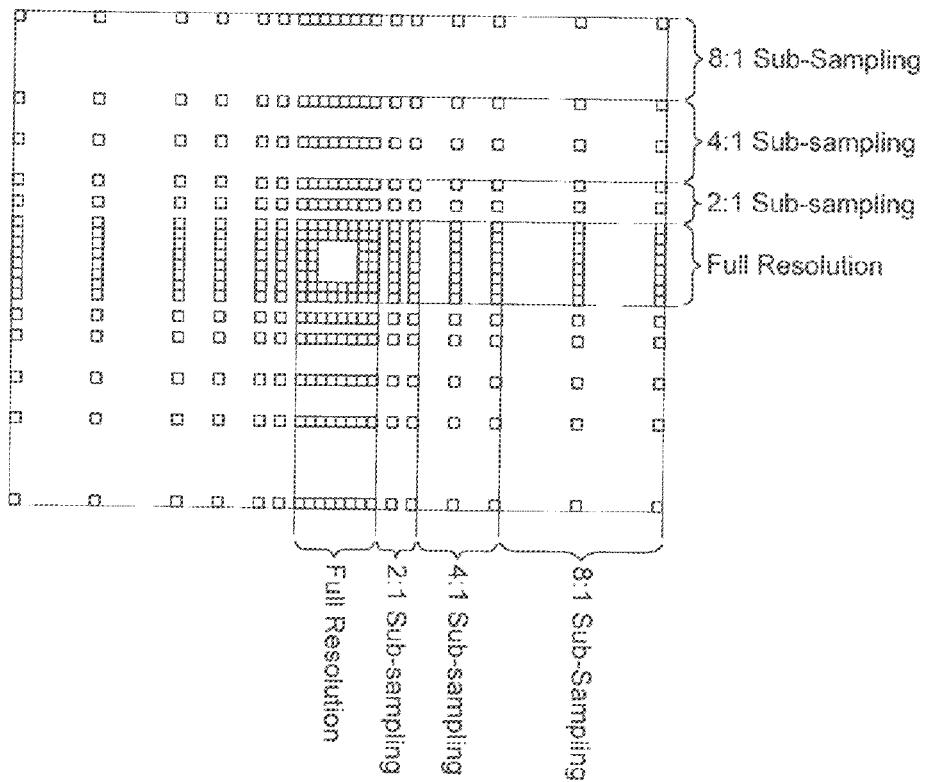
FIG. 8 shows a search area including sampling in vertical and horizontal directions in which pixels diagonally away from the centre are also removed.

FIG. 8 shows a further subsampled search area in which diagonal pixels are also removed in order to reduce the pixel storage requirements.

Returning to FIG. 5, for each block in the input frame, a candidate selector (42), chooses a number of candidate motion vectors, $$\vec{C} = \begin{bmatrix} Cx \\ Cy \end{bmatrix},$$

relating to blocks in the defined search area. The set of candidate vectors are supplied to the candidate evaluator (44) to discover the best match. The motion estimator can choose to use all possible motion vectors within the search area or test only a selection of the vectors. This decision is typically made during the design of the system but may be selectable during use. Described here, the candidate evaluator compares vectors to determine the most suitable candidate using the SAD criterion for simplicity, as described by Equation 1, $$SAD(\vec{C}, \vec{x}) = \sum_{x \in B(\vec{x})}^{n} |F(\vec{x}, n) - F(\vec{x} - \vec{C}, n-1)| \quad \text{Equation 1}$$

, where $\vec{C}$ represents a candidate motion vector, $$\vec{x} = \begin{bmatrix} x \\ y \end{bmatrix}$$

represents the spatial location within the search area, $B(\vec{x})$ represents the block of pixels over which evaluation occurs and $F(\vec{x}, n)$ represents the pixel intensity value at spatial location x and temporal location n.

The pixel information $F(\vec{x}, n)$, is supplied from the current block (48) from the input image data. In order to acquire pixel information from the previous frame, $F(\vec{x}, n-1)$, the input image data passes through a delay (41) and into the sub-sampling block (47). The process of this block is described in more detail later.

The sub-sampling block provides the search-area memory (43) with sub-sampled pixels which in-turn, via an interpolator (49), provides the candidate evaluator (44) with the necessary pixel information to assess the vector candidates. The subsampled pixels are then compared with the pixel information of the current block using the candidate motion vectors. The candidate with the lowest error function is determined to be the best match for the current block, and the associated motion vector is assigned to the block of pixels.

Figure 9:
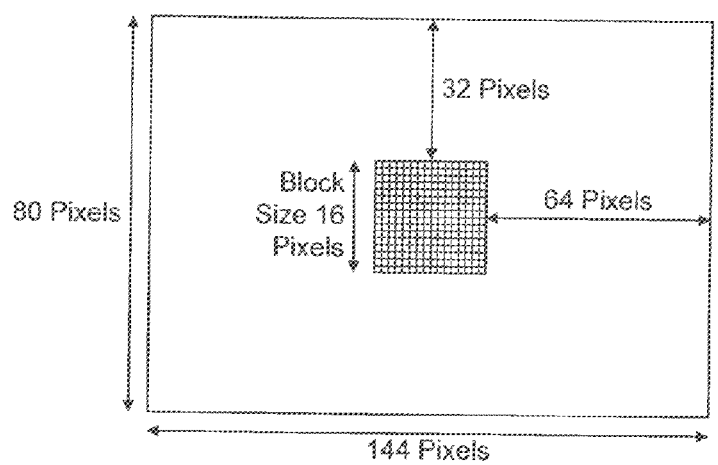
FIG. 9 shows a search area used in an embodiment of the present invention.
Figure 10:
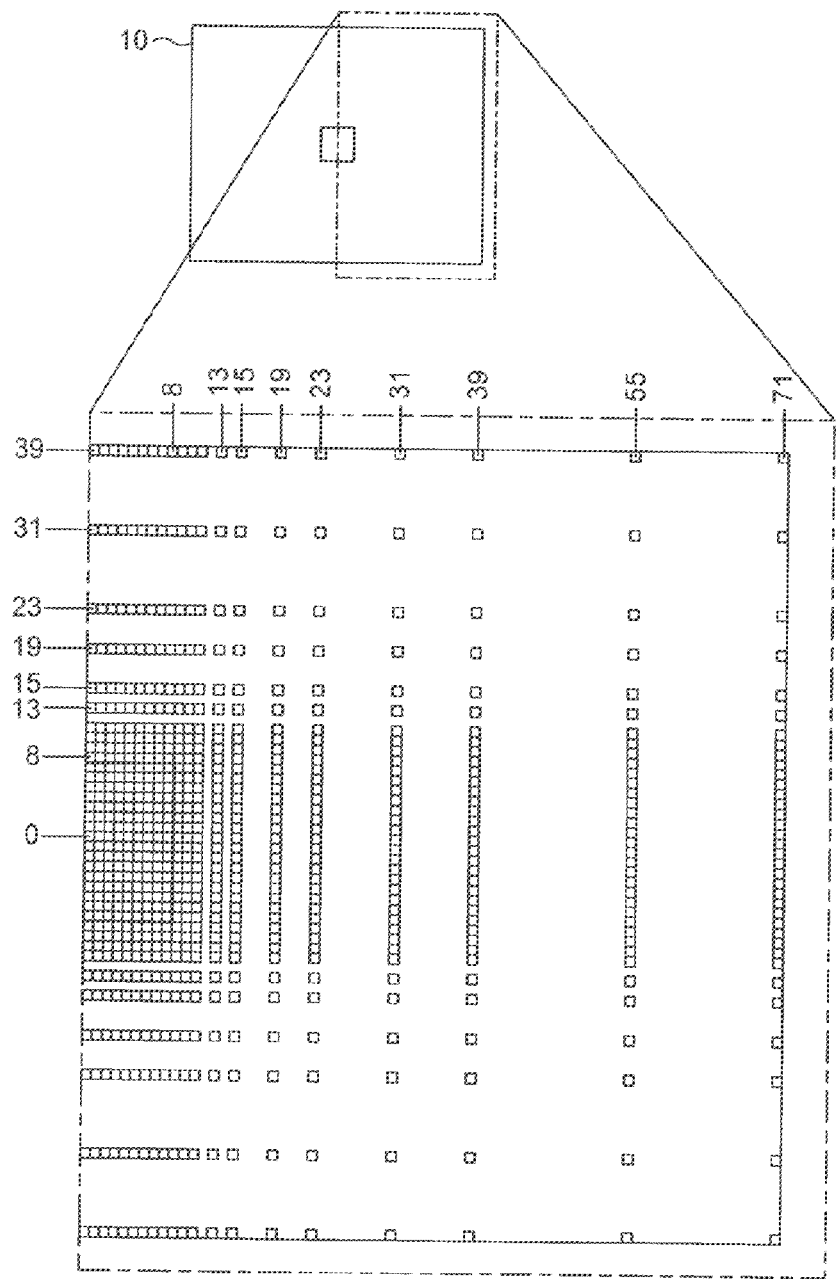
FIG. 10 shows an example of a subsampled search area used in an embodiment of the invention.

For this embodiment, the defined search area will allow a maximum vector size of +/1 64 pixels horizontally and +/−32 pixels vertically as shown in FIG. 9. In further embodiments different sized search areas may be used depending on the requirements and constraints of the system. With a block size of 16×16 pixels, this defines the search area as a set of pixels with dimensions 144×80. The sub-sampling block (47) allows a reduced number of pixels to be stored by directionally sub-sampling the pixels in the search area. For this example, horizontal and vertical sub-sampling are utilised and the pixels selected in the sub-sampling operation are shown in FIG. 10. For simplicity, only the right-half of the full search area (10) is shown es the pattern of pixel selection is symmetrical about the origin. The labels indicate the horizontal and vertical pixel coordinates respectively, with reference to the origin at the centre of the block.

Figure 5:
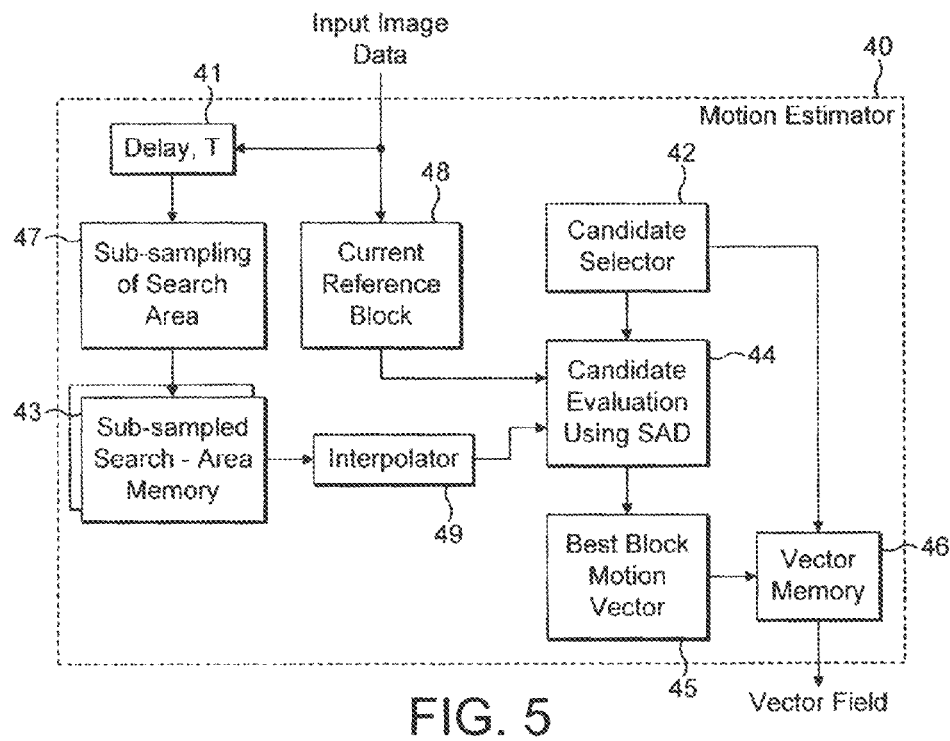
FIG. 5 is a block diagram showing the motion estimator.

Pixels in-between now no longer need to be stored and can instead be estimated during evaluation by the interpolator (49), as shown in FIG. 5. This interpolator performs, for example, a linear interpolation between available pixels although other interpolations could be used. Using the coordinate system. as shown in FIG. 10, if, for example, the pixel within the search area at coordinate (24,9) Is required, an interpolation is performed between pixels (23,0) and (31,0) available from the search area memory as described by Equation 2.

$$\hat{F}(24, n) = \left(1 - \frac{31-24}{8}\right)F(31, n-1) +$$
$$\left(1 - \frac{24-32}{8}\right)F(23, n-1)$$
$$= \frac{1}{8}F(31, n-1) + \frac{7}{8}F(23, n-1)$$

Equation 2

This is trivially extended into a two-stage process for pixels requiring horizontal and vertical interpolation.

Using the sub-sampled search area and the interpolator, pixel information in a large search area can be provided to the candidate evaluation stage of the motion estimator using a reduced number of stored pixels and reduced bandwidth. From the selection of candidates, the best matching vector with the lowest error function is determined and assigned to the current block in the vector memory (46), as shown in FIG. 58.

The vector field from the motion estimator (40) is then used by the motion compensated interpolator (50), as shown in FIG. 4, to reconstruct new frames to increase the frame rate of the video signal. The same search area memory can also be utilised during the motion compensation stage to provide pixels for the reconstructed frame.

It will be clear to those skilled in the art that embodiments of the invention use subsampling to reduce the pixel storage requirements for search areas while maintaining Important Image information which is used to determine the correct motion vectors within video frames. As a result of reducing the number of pixels required to be stored, the bandwidth requirements between the external pixel memory and the internal processing blocks is also reduced.

I claim:

1. An apparatus capable of processing an image sequence, comprising:
   an input for receiving data for a reference image and another image;
   a sub-sampler configured for selecting pixels of the reference image, the selecting comprising applying a plurality of sampling rates to different regions of the reference image;
   a memory coupled to the sub-sampler for storing data for the selected pixels;
   an interpolator coupled to the memory for constructing a representation of a pixel of the reference image from two or more of the selected pixels; and
   an element configured for performing an image processing operation on the another image, using the constructed representation of the pixel of the reference image.

2. The apparatus capable of processing an image sequence of claim 1, wherein the sub-sampler is configured to apply a sampling rate to a particular region of pixels selected according to an indication of detail in that particular region of pixels.

3. The apparatus capable of processing an image sequence of claim 2, wherein the sub-sampler is configured to decrease the sampling rate applied to the particular region of pixels responsive to the indication of detail indicating that detail in the particular region of pixels is low.

4. The apparatus capable of processing an image sequence of claim 1, wherein the sub-sampler is configured to apply a sampling rate to a particular region of pixels selected according to a measure of motion in that particular region of pixels.

5. The apparatus capable of processing an image sequence of claim 1, wherein the sub-sampler is configured to apply a sampling rate to a particular region of pixels selected according to a measurement of high frequency content of the particular region of pixels.

6. A method of processing an image sequence, comprising:
   determining a selection of pixels from a reference image in the image sequence, the selection of pixels determined according to a measure of importance applied to the pixels of the reference image;
   storing the selection of pixels in a memory;
   receiving pixels for another image in the image sequence;
   retrieving the selection of pixels from the memory; and
   performing an image processing operation on pixels of the another image, using the retrieved selection of pixels.

7. The method of claim 6, wherein the determining of the selection of pixels comprises determining a search area within the reference image, and the image processing operation comprises searching for a block of pixels within the search area that matches to a block of pixels in the another image.

8. The method of claim 1, further comprising constructing a version of a pixel of the reference image, which was not stored, based on two or more pixels of the reference image that were selected and stored, and using the constructed version of the pixel in the image processing operation.

9. The method of claim 6, wherein the image processing operation comprises determining motion vectors for blocks of the another image, relative to selected blocks of the reference image, based on the stored selection of pixels in the memory.

10. The method of claim 6, wherein the determining of the selection of pixels comprises sampling areas of the reference image that have comparatively low motion at a higher rate than areas of the reference image that have comparatively more motion.

11. The method of claim 6, wherein the determining of the selection of pixels comprises sampling areas of the reference image at sampling rates determined according to expected amounts of motion in those areas of the reference image.

12. The method of claim 11, wherein the sampling rates comprise a low sampling rate, a medium sampling rate and a high sampling rate.

13. The method of claim 11, wherein the sampling rates comprise sampling rates that are directionally-specific.

14. The method of claim 6, wherein the determining the selection of pixels comprises determining which pixels of the reference image may be discarded with minimal data loss.

15. The method of claim 14, wherein the determining the selection of pixels comprises determining a plurality of sampling rates based on differing amounts of motion within the regions of the reference image.

16. The method of claim 6, further comprising selecting a size of an area of the reference image at which a selected sampling rate of a plurality of sampling rates will be applied.

17. The method of claim 16, wherein the selected sampling rates within each area of the reference image may have different sampling rates in different directions.

* * * * *